United States Patent

[11] 3,598,042

| [72] | Inventor | Harry S. Boyd |
| | | 6409 South Knoxville, Tulsa, Okla. 74135 |
| [21] | Appl. No. | 807,672 |
| [22] | Filed | Mar. 17, 1969 |
| [45] | Patented | Aug. 10, 1971 |

[54] BRAILLE PRINTING SYSTEM
1 Claim, 8 Drawing Figs.

[52] U.S. Cl. ................................................. 101/3, 101/23
[51] Int. Cl. ................................................. B44b 5/00
[50] Field of Search ................................................. 101/3, 5, 6, 23, 28, 29, 18, 401.5; 35/38

[56] References Cited
UNITED STATES PATENTS

| 500,718 | 10/1893 | Orndorff | 101/3 R |
| 642,139 | 1/1900 | Littlewood | 101/3 R |
| 811,787 | 2/1906 | Monske | 101/3 R |
| 920,872 | 5/1909 | Huntoon & McCann | 101/23 X |
| 1,046,351 | 12/1912 | Wait | 101/3 R |
| 1,362,598 | 12/1920 | Brown | 101/23 |
| 1,726,803 | 9/1929 | Bramlette | 101/28 |
| 2,558,877 | 7/1951 | Ress | 101/6 X |

Primary Examiner—William B. Penn
Assistant Examiner—E. M. Coven
Attorney—Head & Johnson ABSTRACT: This invention relates to an element for embossing a braille character into paper. More particularly, the invention relates to a means of printing braille characters into both sides of paper at the same time. Each of the embossing elements includes one or more indentations therein arranged in rows and columns according to an established braille system and spaced apertures aligned in rows and columns, there being a total number of apertures equal to the products of the number of rows times the number of columns, the rows and columns of the apertures being displaced from the rows and columns of indentations and adaptable to receive therein the indentations of opposed embossing elements as the elements are utilized in a printing press.

PATENTED AUG 10 1971

INVENTOR.
HARRY S. BOYD
BY
Head & Johnson
ATTORNEYS

INVENTOR.
HARRY S. BOYD
BY
*Head & Johnson*
ATTORNEYS

INVENTOR.
HARRY S. BOYD
BY
*Head & Johnson*
ATTORNEYS 3,598,042

BRAILLE PRINTING SYSTEM

CROSS-REFERENCE

This disclosure is not related to any pending United States or foreign patent applications.

BACKGROUND, SUMMARY AND OBJECTS OF THE INVENTION

The use of braille as a means of reading by the blind is well known. Generally, braille includes a series of characters formed by arrangements of protrusions formed in paper. The blind read the characters by detecting the arrangement of protrusions by their fingertips moving over the embossed characters. In the established braille system the protrusions are arranged in two vertical columns and three horizontal rows. Thus, each character has a possibility of six protrusions. Each of the letters, numerals, and other characters, including punctuation marks, and so forth, are formed by various combinations of six protrusion positions. For instance, the letter "A" includes only a single protrusion in the upper row of the left-hand column; the letter "B" is formed by protrusions in the upper and middle rows of the left-hand column; the letter "C" is formed by protrusions in the upper row in the left- and right-hand columns; and so forth.

Various means have been provided for printing braille for use by the blind. This invention, however, provides a new and unique arrangement wherein means is provided for printing braille on both sides of a sheet with a single passage of a sheet through a printing press. More particularly, means is provided for printing braille on both sides of a sheet by a single passage of the sheet between adjacent printing press rollers wherein the press may be of the type commonly used for visual printing.

It is therefore an object of this invention to provide an improved braille printing means.

A more particular object of this invention is to provide a system for printing braille adaptable for utilization on standard offset printing presses.

Another object of this invention is to provide a means for printing braille in an arrangement wherein the setting of the braille printing mat may be done by the blind.

Another object of this invention is to provide a means and apparatus for printing braille in which both sides of a sheet of paper are impressed by braille type by single passage of a sheet of paper between adjacent rollers in a standard offset printing press.

These and other objects of the invention will be understood by reference to the following description and claims, taken in conjunction with the attached drawings.

DESCRIPTION OF THE VIEWS

DETAILED DESCRIPTION

Figure 3:
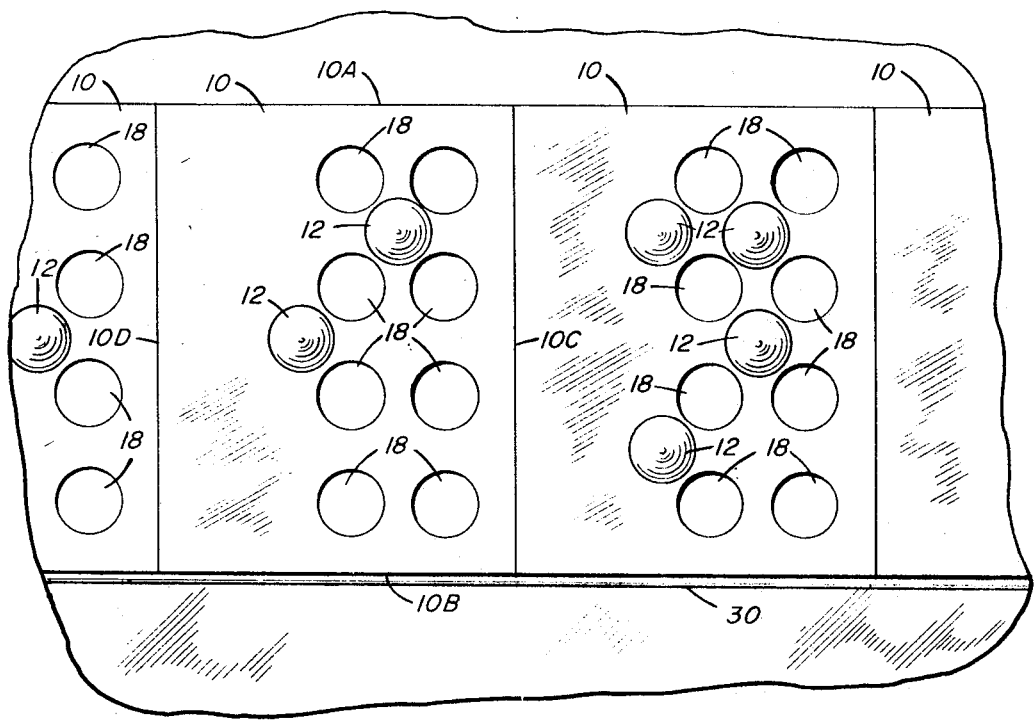
FIG. 3 is an enlarged plan view of embossing elements as utilized in the method and apparatus of this invention for printing braille on both sides of a sheet of paper at the same time.
Figure 7:
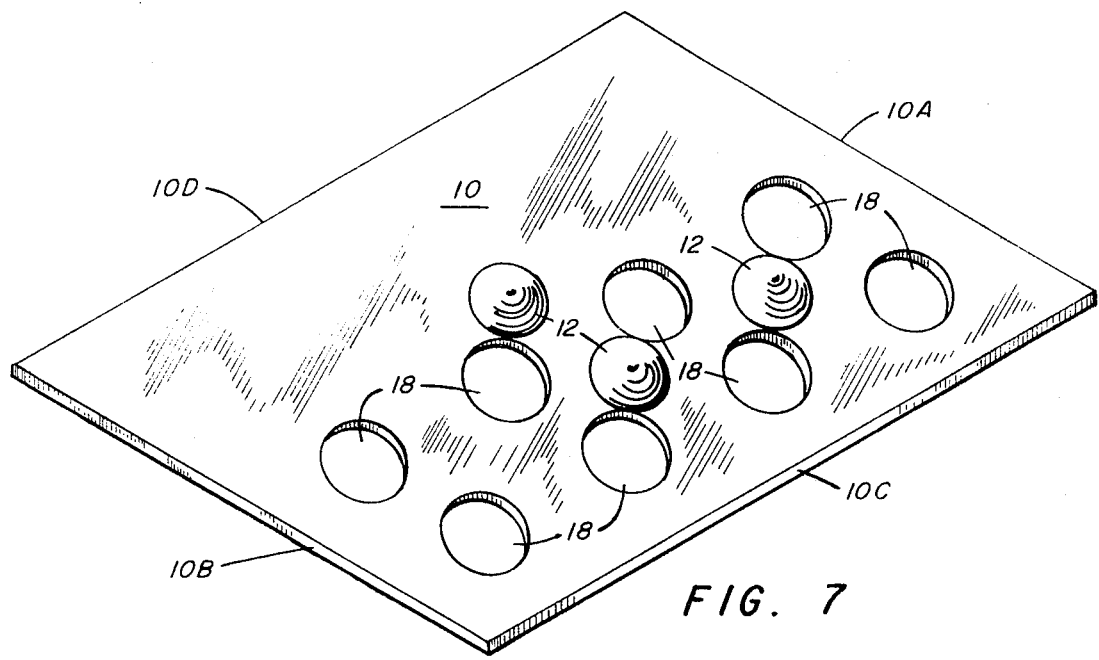
FIG. 7 is a highly enlarged isometric view of an embossing element as utilized for printing one braille character.

The basic portion of this invention is an embossing element 10 shown isometrically in FIG. 7. A top view of two of such elements and portions of two others is shown in FIG. 3. Each of the embossing elements is of a relatively thin, slightly flexible material capable of receiving indentations or impressions. While hard plastics may suffice the ideal material as of the present is thin steel. The elements 10 are rectangular, having parallel horizontal edges 10A and 10B and parallel vertical edges 10C and 10D. While the exact dimensions may vary a practical embodiment includes the arrangement in which each braille element is 0.305 inches in width and 0.402 inches in height and of mild steel approximately 0.006 inches in thickness. Each of the embossing elements 10 includes provisions for spaced indentations or protrusions 12 which, by way of example, may have a base diameter of 0.06 inches and a height of 0.025 to 0.030 inches. The protrusions 12 are arranged in two parallel vertical columns spaced 0.1 inches apart and in three vertical-spaced horizontal rows also spaced 0.1 inches apart. Characters are formed by the combination of protrusions in any one embossing element. For instance, the left full element of FIG. 3 includes two protrusions 12, one being at the top row of the right-hand column and the other at the middle row of the left-hand column. This embossing element forced against a sheet of paper causes corresponding protrusions which would be identified as the letter "I" in the braille alphabet arrangement. The right-hand full embossing element of FIG. 3 shows a letter formed of four protrusions, being the top and bottom rows of the left-hand column and the top and middle rows of the right-hand column, which form the letter "N" in the braille alphabet.

The rows and columns of protrusions are arranged on each embossing element 10 in equally spaced relationship relative to the edges of the embossing elements. As the embossing elements are placed contiguous to each other in rows (there being a portion of one row shown in FIG. 3) proper spacing is provided between each set of character-forming protrusions.

Figure 8:
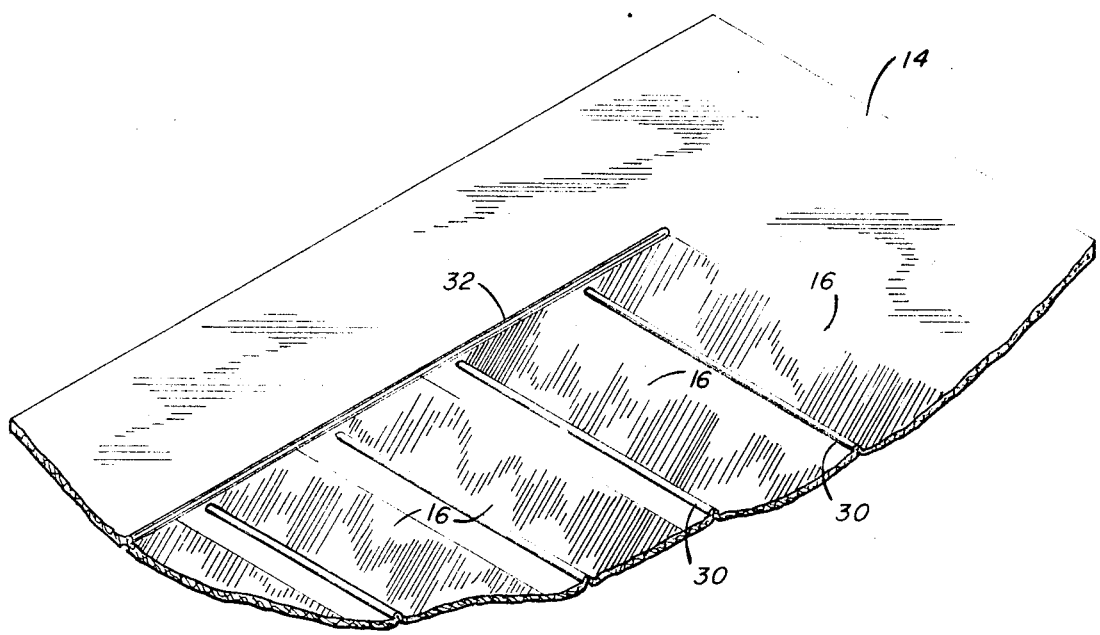
FIG. 8 is an isometric view of a portion of a sheet which may be used to prepare a mat for printing braille by means of an offset printing press.

Thus, type for use in embossing or "printing" braille may be set, by the teaching of this invention, by arranging a sequence of the embossing elements 10 in rows on a mat base. FIG. 8 illustrates a mat base which may be utilized for this purpose. The mat base 14 is a flexible sheet of material, preferably heavy paper or cardboard. The mat base 14 has spaced rows 16 of pressure-sensitive adhesive formed thereon. A braille-embossing mat which can be utilized in a printing press may be formed by placing the individual embossing elements 10 adjacent to each other on the rows of pressure-sensitive adhesive 16. Once the rows are completed with the embossing elements 10 the mat can be affixed to a cylinder of a printing press and as paper is pressed against the mat the protrusions of the individual embossing elements project into the paper and cause discernable protrusions therein which the blind can detect.

The base mat 14 is provided with an embossed horizontal ridge 30 below and contiguous to each adhesive row 16 and an embossed vertical margin ridge 32. These ridges 30 and 32 serve as guides to enable mats for embossing braille to be prepared by the blind. By the use of braille-embossing elements 10 on the base mat 14 of FIG. 8 a blind person can set the "type" or embossing elements to prepare a mat usable on an offset printing press.

Referring again to FIG. 7, it can be seen that another distinguishing characteristic of the embossing element 10 is the provision of spaced paralleled columns and rows of apertures 18. Each aperture 18 is of, by way of example, 0.07 inches in diameter, or just slightly larger than the base of protrusions 12. The rows of apertures 18 are offset 0.05 inches from the rows of protrusions 12, and in like manner, the columns of apertures 18 are offset 0.05 inches from the columns of protrusions.

To practice the invention there must be a total number of apertures 18 in each embossing element 10 equal to the number of rows times the number of columns of protrusions making up the braille system. Since the standard braille system includes three rows and two columns there must be six apertures in each braille element 10 when the invention is to be utilized with the standard braille system. In each of the drawing illustrations each braille element 10 is provided with eight apertures, although it is to be understood that only six apertures are necessary to practice the invention utilizing the standard braille system. The reason for the illustrating provision of eight apertures in each embossing element will be given subsequently.

Figure 1:
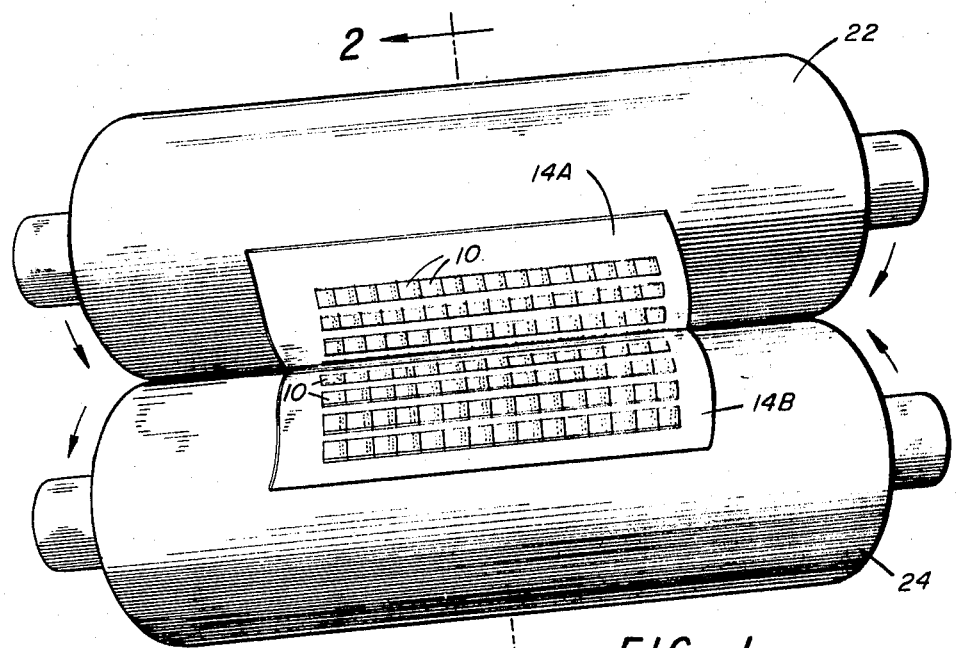
FIG. 1 is an isometric view of two rollers of a printing press showing mats affixed to the rollers for the embossing of a braille type into both sides of a sheet of paper by a single passage of a sheet of paper through the rollers.
Figure 2:
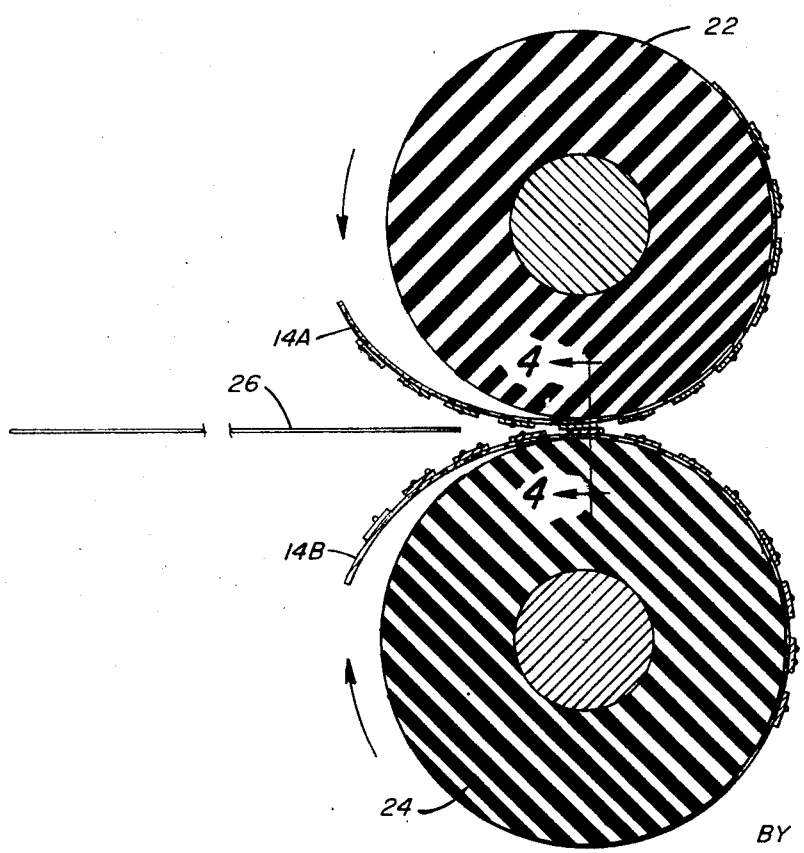
FIG. 2 is a cross-sectional view taken along the line 2–2 of FIG. 1.
Figure 4:
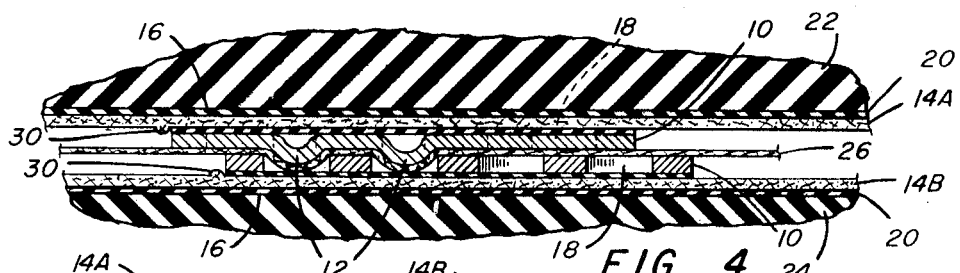
FIG. 4 is a highly enlarged cross-sectional view taken between the contiguous portion of printing press rollers showing means whereby a sheet of paper is embossed on both sides at the same time by a single passage through the printing press, the surface of the peripheral surfaces of the rollers being shown flat for purposes of clarity.

FIGS. 1, 2 and 3 show the arrangement wherein this invention may be utilized with a standard offset printing press for printing braille on both sides of a sheet of paper at the same time. In preparation for printing, two mats 14A and 14B are prepared as previously described, that is, by arranging sequences of contiguous embossing elements 10 in equally spaced parallel rows on the base mat material 14. The mats 14A and 14B each have a backing of pressure-sensitive adhesive 18, as illustrated in FIG. 4. With the two mats 14A and 14B prepared for printing, the mats are placed together with the embossing elements 10 contiguous to each other. The embossing elements 10 are aligned so that the protrusions 12 in the embossing elements of mat 14A align with and are received by apertures 18 in the embossing elements 10 affixed to mat 14B. In like manner the protrusions 12 in the embossing elements 10 affixed to mat 14B are aligned with and are received by the apertures 18 of the embossing elements 10 affixed to mat 14B. Thus each of the embossing elements 10 is both a male and female braille-printing dye.

With the mats 14A and 14B aligned so that the protrusions 12 in each of the embossing elements 10 are aligned with apertures 18 in the opposed embossing element the mats can then be run between printing cylinders 22 and 24. Cylinders 22 and 24 may by cylinders of a typical rotating cylinder printing press, such as an offset press. One of such cylinders may function in the usual application of the press, that is, when the press is utilized for visible printing, as an impression cylinder and the other blanket cylinder. Any press which provides two cylinders which rotate in opposite directions and have their peripheral cylindrical surface traveling contiguous to each other at the same speed and which are adapted to receive paper therebetween may be utilized to practice this invention for printing braille.

As the mats 14A and 14B pass between the cylinders 22 and 24 the pressure-sensitive adhesive 20 on the backs thereof secures the mats to the cylinders. Since the mats are easily aligned with the protrusions of the embossing elements affixed to each mat extending into apertures in opposite embossing elements, the mats as secured to the rollers 22 and 24 will be in perfect alignment.

With the mats secured to the cylinders 22 and 24, paper fed therebetween is embossed with the braille printing, the embossing being impressed into both sides of the paper simultaneously. FIG. 4 shows a partial, enlarged, cross-sectional view as taken along the line 4–4 of FIG. 2, showing the mating of two embossing elements 10 with the paper 26 therebetween showing the extension of two protrusions of the upper embossing element extending into recesses in the lower embossing element forcing a permanent indentation into the paper 26.

FIG. 2 shows the mats 14A and 14B being applied to the cylinders 22 and 24 and shows the position of a sheet of paper 26 preparatory to passing between the cylinders to receive embossing on both sides thereof after the mats are first secured by pressure-sensitive adhesive to the cylinders 24.

Figure 5:
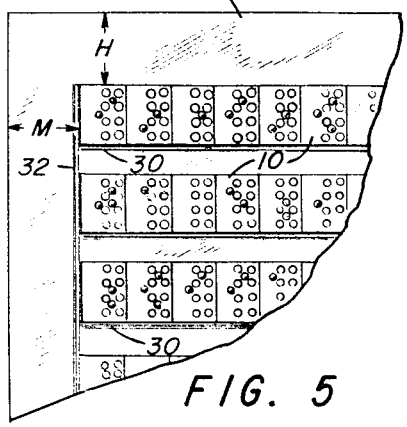
FIG. 5 is a fragmentary view of a mat showing the embossing elements arranged in spaced parallel rows as the mat is ready for affixing to a roller in a printing press.
Figure 6:
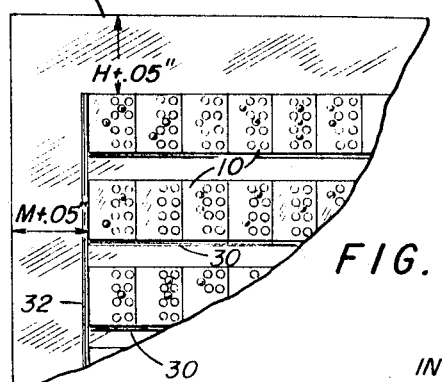
FIG. 6 is a fragmentary view of a second mat ready for affixing to a second roller of a printing press, the embossing elements being offset vertically and horizontally slightly relative to the arrangement on the mat of FIG. 5.

FIGS. 5 and 6 show the portions of two mats 14A and 14B and show the arrangement of the embossing elements 10 on each mat. If the two mats are to be arranged such that when placed on cylinders 22 and 24 the edges of the mats are to be coincident, then the rows of embossing elements on one mat must be offset vertically and horizontally relative to the rows on the opposing mat. As shown in FIGS. 5 and 6 the elements 10 are arranged so that when properly aligned the edges of the mat would be coincident. In this embodiment of the invention the rows and columns of apertures 18 are offset vertically and horizontally relative to the rows and columns of protrusions 12 on each of the embossing elements 10 by the amount of 0.05 inches, and therefore the horizontal and vertical ridges 30 and 32 respectively on mat 14B will be offset 0.05 inches relative to that on a mat 14A. It can be seen that in the general application of the invention it will not be important that the edges of the mats coincide and therefore the horizontal ridges 30 and vertical ridges 32 on the base mats can be the same. This will merely mean that when the mats are positioned and aligned contiguously prior to insertion between rollers 22 and 24 the vertical and horizontal edges will be offset relative to each other in an amount of 0.05 inches.

As previously stated, the number of apertures required in each embossing element is the product of the rows and columns in the braille system being used, therefore six in the standard system. By the use of eight apertures 18 in each braille element 10, as illustrated, the mats 14A and 14B may be offset vertically relative to each other in either vertical direction. If desired, an additional column of apertures in each braille element could be provided to permit alternate horizontal offset of one mat relative to the other.

The printing of braille is, of course, well known as well as the ability to print braille on both sides of a sheet. This invention, however, is primarily directed towards a simple and inexpensive arrangement to adapt many types of commonly available rotating cylinder printing presses, such as offset printing presses, to print braille. The invention includes not only a means to adapt a printing press to print braille but also includes the further refinement for the simultaneous printing of braille on both sides of a sheet at the same time by means of commonly available standard printing presses. The term "printing" as used herein means, except when visible printing is specifically mentioned, the embossing of discernable braille characters in paper.

Mat base 14 may, as previously stated, be of heavy paper or cardboard. Another arrangement includes the use of mats of clear plastic sheets. The advantage of clear plastic is that it enables the user to visually align two mats before they are placed between rollers in a printing press to make sure the protrusion on the embossing elements affixed to each mat align with apertures in the embossing element affixed to the opposite mat. Such clear plastic sheets as used for mats should be of the type plastic which is not unduly hard, that is, the plastic should have some resiliency or depressibility, like thick paper or cardboard. In this way each protrusion of each embossing element engaging the sheet of paper being embossed extends through an aperture in a mating embossing element and protrudes into the mat to form a deeper embossed protrusion in the paper being embossed.

This invention has been described as it relates to the use of presses employing rotating cylinders, particularly as the invention is applicable to the embossing of braille on both sides of a sheet of paper at the same time. When it is desired to emboss on only one side of a sheet, the invention may be used with cylinder presses, or may also be used with platen presses.

While the invention has been described with a certain degree of particularity it is manifest that many changes can be made in details of construction, the arrangement of components, and the steps of practicing the invention without departing from the spirit and scope hereof.

What I claim is:

1. A press for impressing braille printing on both sides of a sheet at the same time, comprising:
  a first cylinder;
  a second cylinder, said cylinders being simultaneously rotatable and having their peripheries in adjacent relationship for passing a sheet therebetween;
  a first mat having the inner surface affixed to the peripheral surface of said first cylinder;
  a second mat having the inner surface affixed to the peripheral surface of said second cylinder; and
  braille-embossing elements affixed to the outer surface of each of said mats in equally spaced paralleled rows, each of said braille-embossing elements being a rectangular member of deformable material having one or more indentations therein each providing a small diameter protrusion in one surface of the member, such indentations being arranged in aligned rows and columns according to an established braille system, and said braille-embossing elements each having spaced apertures therein in aligned rows and columns, there being a total number of apertures equal to the product of the number of rows times the number of columns, said rows and columns of apertures being displaced from said rows and columns of indentations by a preselected distance, said rows of braille-embossing elements affixed to said first mat being displaced from said rows of braille-embossing elements affixed to said second mat by said preselected distance whereby each protrusion of each of the braille-embossing elements affixed to said first mat mate with and protrude into a said aperture in a said braille-embossing element affixed to said second mat and each protrusion of each of said braille-embossing elements affixed to said second mat mate with and protrude into a said aperture in a said braille-embossing element affixed to said first mat as said rows of braille-embossing elements on said first cylinder overlap corresponding rows of braille-embossing elements on said second cylinder as the cylinders are simultaneously rotated.